United States Patent

McCaffrey et al.

[11] Patent Number: 6,003,662
[45] Date of Patent: Dec. 21, 1999

[54] QUICK-CHANGE GUIDE RAIL SUPPORT

[75] Inventors: Peter P. McCaffrey; John P. Williamson, both of Wilmington, N.C.

[73] Assignee: Fenner, Inc., Manheim, Pa.

[21] Appl. No.: 08/912,208

[22] Filed: Aug. 15, 1997

Related U.S. Application Data

[60] Provisional application No. 60/023,581, Aug. 19, 1996, and provisional application No. 60/050,077, Jun. 13, 1997.

[51] Int. Cl.$^6$ .................................................. B65G 21/22
[52] U.S. Cl. .......................................................... 198/836.3
[58] Field of Search .......................................... 198/836.3

[56] References Cited

U.S. PATENT DOCUMENTS

| | | |
|---|---|---|
| 3,280,962 | 10/1966 | Stone et al. . |
| 3,647,051 | 3/1972 | Didas ....................... 198/204 |
| 3,776,350 | 12/1973 | Tice ......................... 198/204 |
| 3,800,938 | 4/1974 | Stone ....................... 198/204 |
| 4,470,499 | 9/1984 | Sijbrandij ................. 198/836 |
| 4,502,594 | 3/1985 | Sijbrandij ................. 198/836 |
| 4,759,437 | 7/1988 | Bevins ...................... 198/632 |
| 5,322,160 | 6/1994 | Markiewicz et al. ...... 198/836.3 |
| 5,492,218 | 2/1996 | Falkowski ................. 198/836.3 |
| 5,782,339 | 7/1998 | Drewitz .................... 198/836 |

FOREIGN PATENT DOCUMENTS 1072026  6/1967  United Kingdom ................ 198/836.3

*Primary Examiner*—William E. Terrell
*Assistant Examiner*—Mark Deuble
*Attorney, Agent, or Firm*—Dann, Dorfman, Herrell and Skillman; Henry H. Skillman

[57] ABSTRACT

A support for the guide rail of a conveyor which enables the guide rail to be adjusted among a plurality of pre-set positions in a quick and simple manner with precision. The guide rail is supported by a generally horizontal support arm which is supported by a vertical post on the frame of the conveyor alongside the conveyor belt. The arm has a series of notches or receptacles along the underside of its length and the post has a stop member having a latch adapted to engage in the receptacles. The stop member is a cap telescopically engaged on the post and biased upwardly by a spring. The cap includes latch portions facing upwardly adapted to engage in the notches on the arm.

7 Claims, 1 Drawing Sheet

PRIOR-ART

QUICK-CHANGE GUIDE RAIL SUPPORT

The benefit of provisional application 60/023,581, filed Aug. 19, 1996, and provisional application 60/050,077, filed Jun. 13, 1997, is hereby claimed.

FIELD OF THE INVENTION

The present invention relates to a guide rail support for a conveyor line, and is particularly applicable to quick-change adjustable guide rails for conveyor lines for bottling apparatus.

BACKGROUND OF THE INVENTION

Conveyor lines for bottles normally have rails positioned along opposite sides of the line in order to prevent the bottles from falling away from the moving conveyor belt. The side rails are disposed on opposite sides of the conveyor belt and the bottles travel between the fixed rails. When a conveyor line is converted to transport bottles of different size, the conventional method for adjusting the spacing of the side rails depends on the skills of the mechanics to avoid maladjustment.

Quick-change mounts for the side rails have been proposed, but the need for precise adjustment of the side rails after changing their position has made such quick-change adjustments subject to mechanic error.

SUMMARY OF THE INVENTION

The present invention provides an adjustable support for a conveyor side rail which is easily adjusted to predetermined positions with little mechanical skill on the part of the operator.

More specifically, the present invention provides a simple and effective device for adjusting the lateral positions of the side rails on a conveyor system among a plurality of pre-set positions.

The illustrated embodiment of the adjusting mechanism includes a spring-loaded latch which cooperates with a toothed member mounting the side rail to enable longitudinal adjustment of the member and thereby the side rail by releasing the spring latch and latching of the member in adjusted position by engagement of the latch in receptacles provided by the teeth of the toothed member. The latch of the present invention is a self-contained unit which maintains its operability under harsh operating conditions and is not subject to jamming or operating failures when installed in areas which are subject to contamination by dust, or spillage of product.

DESCRIPTION OF THE PREFERRED EMBODIMENTS

Figure 1:
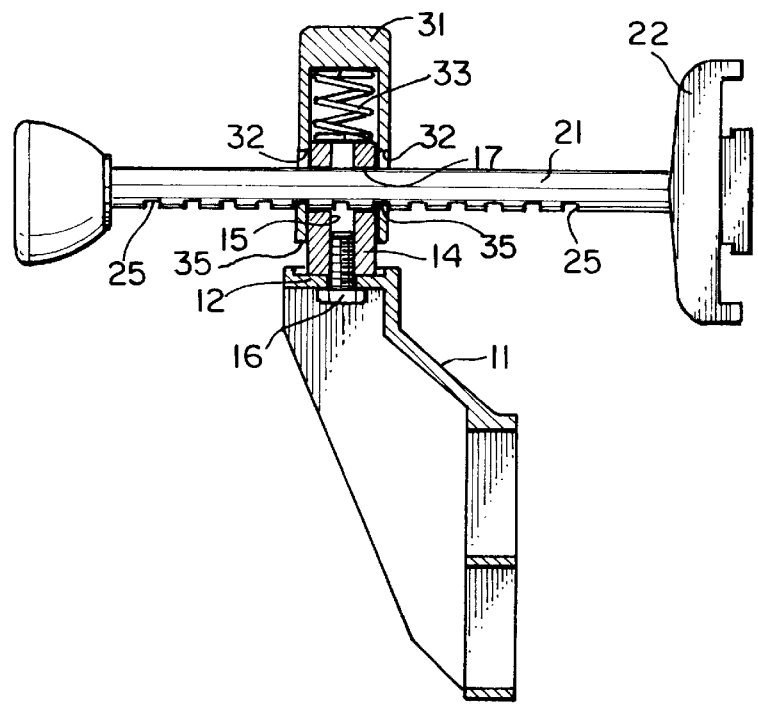
FIG. 1 is a sectional view through an adjustable rail support embodying the present invention.

FIG. 1 illustrates a mounting assembly embodying the present invention. As shown, there is a mounting bracket 11 adapted to be mounted alongside the conveyor belt having an arm projecting angularly upward and outward to terminate in a seating flange 12. The flange 12 mounts an upstanding shaft 14, for example in the form of a post having a vertical through-bore 15 threaded at the lower end to receive a bolt 16 which anchors the post 14 to the flange in an upright position. The post 14 is provided with a transverse slot or through-slot 17 adapted to slidably receive an elongated arm 21 having a guide-rail bracket 22 mounted on its inner end so as to overlie the conveyor. The slot 17 is generally perpendicular to the path of travel of the conveyor belt. The bracket 22 is adapted to mount guide rails or bumpers (not shown in FIG. 1, but shown at 89 in FIG. 2) extending parallel to the conveyor. The lower surface of the mounting arm 21 is toothed, i.e. provided with a series of notches or receptacles 25 which, in the present instance, are equally spaced along the length of the arm.

A stop mechanism is mounted on the upright post 14 to latch the arm at any selected position determined by the receptacles 25. To this end, a hollow cap 31 is telescopically engaged with the post 14 for relative vertical movement. The hollow cap 31 has slots 32,32 on opposite sides which are sufficiently wide to accommodate the arm 21 when the cap slots 32 are in registry with the through-slot 17 of the post. A spring 33 is captured within the hollow cap and is seated at one end in the top portion of the cap and seated in the other end against the top of the post 14, thereby biasing the cap upwardly relative to the post. The cap is displaceable downwardly on the post against the bias of the spring 33 to cause the cap slots 32 to register with the through-slot 16 of the post.

The hollow cap 33 below the slot 32, as indicated at 35 in FIG. 1, has a wall thickness corresponding to or less than the width of the receptacles 25. The distance between the opposite sides of the cap between the side wall portions 35,35 corresponds to a spacing between the receptacles 25, so as to enable the cap wall portions at the bottom of the openings forming the cap slots 32 to latch the toothed arm 21 in adjusted position. In this case, the spacing between the marginal wall portions 35 is an integral multiple of the spacing between adjacent receptacles, e.g. twice the spacing between adjacent receptacles, so that marginal portions of the openings which form the through slots 32,32 in the hollow cylindrical wall serve as latches selectively engaging the receptacles. Thus, the spacings of the receptacles 25 in the arm 21 permit longitudinal adjustment of the arm in increments equal to the spacing between the receptacles which is one half the spacing between the side walls 35.

The cap 31 is retained on the post 14 by the arm 21 passing through the slots 32. It may be removed from the post by removing the arm and lifting the cap away from the top of the post. To this end, the bracket 22 is removably mounted on the arm 21 so that upon removal of the bracket, the cap 31 may be depressed and the arm can be retracted through the registering slots 16 and 32. Alternatively, the other end of the arm may be modified to enable the other end to be advanced through and beyond the registering slots.

Figure 2:
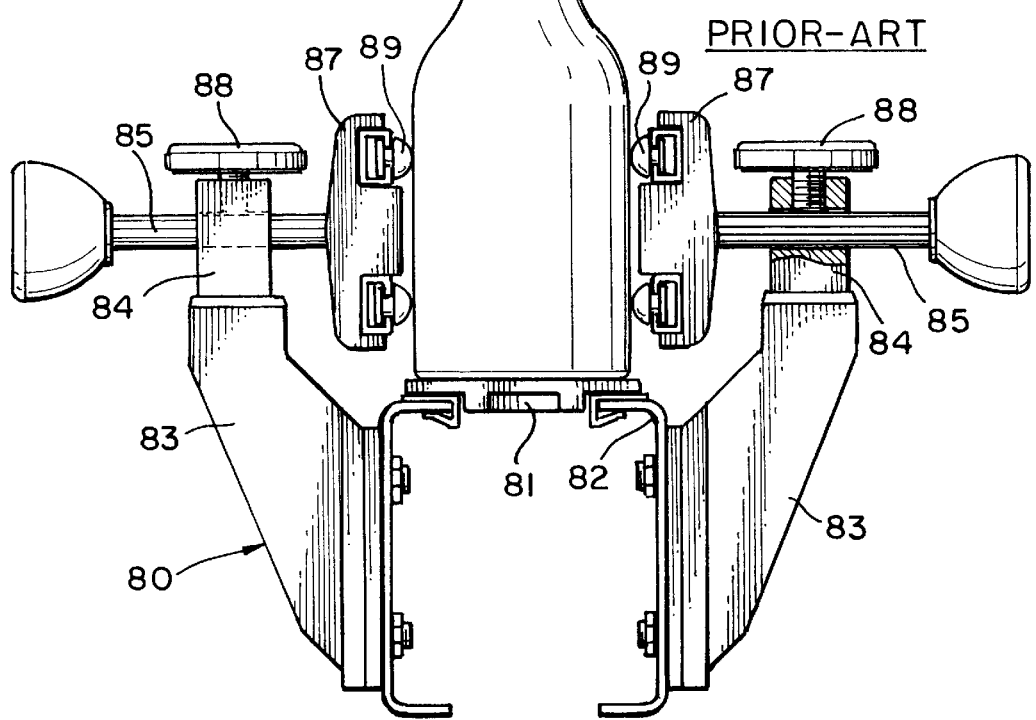
FIG. 2 is an illustration of a prior art device showing a bottle conveyor having a mounting assembly which the present invention is designed to replace.

FIG. 2 shows a prior art conveyor in which a conveyor 80 has a run 81 which travels on a bed 82 formed by confronting channel members. At intervals along the bed 82, for example 4–6" intervals, mounting brackets 83 project outwardly and upwardly and terminate in upstanding posts 84. Each post has a through-slot (not shown) for accommodating the arm 85 which mounts at its inner end a rail 87 for supporting and positioning bumpers 89. The post 84 has a through-bore into which is threaded a thumb screw 88. The thumbscrew 88 has an adjusting knob at the top and a threaded shaft which engages in the bore and bears against the arm 85 as it passes through the post 84, thereby anchoring the arm against lateral movement through this slot. When it is desired to change the spacing between the guide rails 87, the mechanic releases the thumb screw 88 and adjusts the arm 85 to proper extent to provide the desired spacing between the rails 87,87. As is apparent, the proper adjustment of the side rails 87 relies on the ability of the mechanics to properly position the arms 85 in the posts 84 so as to overlie the conveyor 81 as desired.

Comparing the illustrated embodiment of the present invention to the device shown in FIG. 2, the notches or receptacles 25 provide a limited number of settings in which the arm 21 may be positioned so that by placing the corresponding notches under the latch cap 31, it is possible to adjust all of the arms to the precise same extent, thereby achieving a precise readjustment of the guard rail 22. The cap 31 is fixed relative to the conveyor and serves as a stop engaging the series of receptacles on the arm 21, and also serves to shield the working parts of the quick-change adjusting mechanism from contamination by the dirt and other contaminants which may be present in the area of the conveyor.

While a particular embodiment of the invention has been herein illustrated and described, it is not intended to limit the invention to such disclosures, but changes and modifications may be made therein and thereto within the scope of the following claims.

We claim:

1. An adjusting mechanism for a side rail for a conveyor adapted to run in a path of travel along a bed, said bed having support arms extending upwardly and outwardly from the bed to support the side rail at spaced-apart locations along the length of the path of travel, said adjusting mechanism comprising an upstanding post mounted on each of said support arms, each said post having a through-slot transverse to said path of travel, and a stop adjustably mounted relative to said post, an arm mounted in said through-slot for longitudinal adjustment transverse to said path of travel, said arm having a guide rail bracket adapted to mount a guide rail generally parallel to said conveyor path, a series of receptacles in said arm along its length to provide a plurality of settings for the longitudinal position of said arm and thereby said guide rail, said stop comprising a hollow cylindrical member telescopically engaged with said post, the cylindrical wall of said member having a portion adapted to engage in at least one of said receptacles to comprise a latch, said telescopic engagement affording vertical displacement of said cap on said post between engaged and disengaged positions, in the engaged position said latch being engaged in at least one of said receptacles to anchor the arm against longitudinal displacement in said transverse through-slot and in the disengaged position said latch being disengaged from said receptacles to afford displacement of said arm to enable registry of said latch with a different receptacle in said series.

2. An adjusting mechanism according to claim 1 wherein said hollow cylindrical cap has a slot through the hollow cylindrical wall thereof adapted to register with the through-slot of said post, said latch portion of the wall being at the perimeter of said cap slot.

3. An adjusting mechanism according to claim 2 wherein said cap has a pair of diametrically-opposite openings in said cylindrical wall forming said cap slot, said latch being formed by a marginal portion of one of said openings, and said stop has a second latch formed by a marginal portion of the other of said openings, said latches being spaced apart by a distance approximately equal to the diameter of said hollow cylindrical cap.

4. An adjusting mechanism according to claim 3 wherein said receptacles are spaced uniformly along the length of the arm, and the diameter of the hollow cylindrical cap is an integral multiple of the spacing between adjacent receptacles in said series along the length of the arm.

5. An adjusting mechanism according to claim 1 wherein said hollow cylindrical cap is closed at the top and houses a spring between the top of the cap and the top of the post so as to bias the cap upwardly toward said engaged position and to permit downward displacement of the cap against the bias of the spring towards said disengaged position.

6. An adjusting mechanism according to claim 5 wherein the hollow cylindrical wall of said cap has diametrically-opposed openings forming a cap slot adapted to register with the through-slot of the post, the bottom marginal portions of said openings comprising latches to engage the receptacles, said receptacles being positioned in the bottom side of the arm to be engaged by said latches when the cap is biased upwardly by said spring.

7. An adjusting mechanism according to claim 6, wherein said guide rail bracket is releasably mounted on said arm, said arm having a cross-sectional dimension affording retraction of the arm through and beyond said through-slots and said cap slot upon removal of the bracket, thereby affording disengagement of said cap from said post.

* * * * *